(12) United States Patent
Sivakumar et al.

(10) Patent No.: US 11,095,621 B2
(45) Date of Patent: Aug. 17, 2021

(54) SELECTIVE COGNITIVE SECURITY FOR COMMUNICATION DATA

(71) Applicant: International Business Machines Corporation, Armonk, NY (US)

(72) Inventors: Gandhi Sivakumar, Melbourne (AU); Anand Pikle, Pune (IN); Amol A. Dhondse, Pune (IN); Laura Rusu, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 16/134,204

(22) Filed: Sep. 18, 2018

(65) Prior Publication Data

US 2020/0092265 A1    Mar. 19, 2020

(51) Int. Cl.
*H04L 29/06*    (2006.01)
*G06F 21/62*    (2013.01)
*G06N 20/00*    (2019.01)

(52) U.S. Cl.
CPC .......... *H04L 63/0428* (2013.01); *G06F 21/62* (2013.01); *G06N 20/00* (2019.01); *H04L 63/20* (2013.01)

(58) Field of Classification Search
CPC . H04L 63/0428; H04L 63/20; H04L 63/0457; H04L 63/205; H04L 63/105; G06N 20/00; G06F 21/62; G06F 2221/2101; G06F 2221/2105
See application file for complete search history.

(56) References Cited

U.S. PATENT DOCUMENTS

| | | | |
|---|---|---|---|
| 8,286,237 B2 | 10/2012 | Moghe | |
| 8,442,187 B2 | 5/2013 | Jaiswal et al. | |
| 8,503,621 B2 | 8/2013 | Patel et al. | |
| 8,561,127 B1 | 10/2013 | Agrawal et al. | |
| 8,812,319 B2 | 8/2014 | Skerpac | |
| 9,317,501 B2 | 4/2016 | Kraenzel et al. | |
| 2007/0206738 A1* | 9/2007 | Patel | H04M 3/53333 379/93.24 |

(Continued)

FOREIGN PATENT DOCUMENTS

EP    3001402 A1    3/2016

OTHER PUBLICATIONS

Anthony D. Joseph et al., "Machine Learning Methods for Computer Security", Dagstuhl Reports, vol. 2, Issue 9, Sep. 2012, pp. 109-130.

*Primary Examiner* — Henry Tsang
(74) *Attorney, Agent, or Firm* — Nicholas D. Bowman; Hunter E. Webb; Keohane & D'Alessandro, PLLC

(57) ABSTRACT

An approach for securing sensitive information in communication data is provided. In an embodiment, communication data is received from an ongoing communication (e.g., phone conversation, exchange of text messages, etc.) between a user and at least one other person. Contextual input is derived based on the content of the communication data and historical data from one or more external sources. A sensitivity index score for each element (e.g., portion) of the communication data is derived based on an assessment of the contextual input. The elements of the communication data having a sensitivity index score greater than a predefined threshold value are deemed to be security sensitive and, therefore, are encoded prior to transmission to its intended recipient.

17 Claims, 4 Drawing Sheets

(56) References Cited

U.S. PATENT DOCUMENTS

| | | | |
|---|---|---|---|
| 2010/0011000 A1* | 1/2010 | Chakra | G16H 10/60 |
| | | | 707/E17.005 |
| 2012/0023323 A1 | 1/2012 | Kent, Jr. et al. | |
| 2014/0090071 A1 | 3/2014 | Salehie et al. | |
| 2014/0149322 A1* | 5/2014 | LaVoie | G06Q 10/10 |
| | | | 706/12 |
| 2015/0281446 A1* | 10/2015 | Milstein | H04M 3/5166 |
| | | | 379/88.01 |
| 2016/0104476 A1 | 4/2016 | Allen et al. | |
| 2017/0054697 A1 | 2/2017 | Zhang et al. | |
| 2018/0152471 A1* | 5/2018 | Jakobsson | H04L 63/1433 |
| 2018/0241703 A1* | 8/2018 | Feuz | G06Q 10/10 |
| 2019/0019154 A1* | 1/2019 | Girdhar | H04L 51/14 |

* cited by examiner

SELECTIVE COGNITIVE SECURITY FOR COMMUNICATION DATA

TECHNICAL FIELD

In general, embodiments of the present invention relate to secure communications. Specifically, embodiments of the present invention provide a learning system that utilizes historical and contextual information to selectively apply a security protocol to security sensitive information in communication data.

BACKGROUND

As more and more enterprises move towards processing large amounts of data and insights derived from analytics, information security is increasingly more important for confidential communication for corporate, as well as personal, communication. It is important that requisite security is provided in two-way and multi-way text/audio/video communications to ensure there is no vulnerability to attacks from intruders. Unintended, mischievous, or malicious attacks can occur in order to access sensitive (i.e., private, personal, or commercially valuable) information and data.

Sensitive data can include personal (e.g., name, address, social security numbers, and the like), financial (e.g., bank account and routing numbers, credit card numbers, billing addresses, and the like), business or commercial (e.g., trade secrets, confidential business information, sales data, and the like) and other data and information, which may be intercepted and used for unauthorized or malicious purposes, often harming the original or genuine user due to identity theft, business disparagement, financial losses, and credit history damage, among other things.

Protecting sensitive data transmitted from end user applications is difficult and conventional techniques can be problematic. Typically, data is secured (e.g., encrypted/decrypted) using security techniques such as passwords (i.e., authentication) and encryption. However, these measures are often indiscriminate and general, without regard to the type or nature of information and data involved in a particular transmission.

SUMMARY

In general, an approach for securing sensitive information in communication data is provided. In an embodiment, communication data is received from an ongoing communication (e.g., phone conversation, exchange of text messages, etc.) between a user and at least one other person. Contextual input is derived based on the content of the communication data and historical data from one or more external sources. A sensitivity index score for each element (e.g., portion) of the communication data is derived based on an assessment of the contextual input. The elements of the communication data having a sensitivity index score greater than a predefined threshold value are deemed to be security sensitive and, therefore, are encoded prior to transmission to its intended recipient.

A first aspect of the present invention provides a method for securing sensitive information in communication data, comprising: receiving as input a communication data; deriving a contextual input using a content of the communication data and historical data from one or more external sources; generating, based on an assessment of the contextual input, a sensitivity index score for a plurality of elements of the communication data; and encoding an element of the communication data having a sensitivity index score above a predefined threshold value, wherein at least one other element of the communication data having a sensitivity index score below the predefined threshold value remains unencoded.

A second aspect of the present invention provides a system for securing sensitive information in communication data, comprising: a memory medium comprising instructions; a bus coupled to the memory medium; and a processor coupled to the bus that when executing the instructions causes the system to: receive as input a communication data; derive a contextual input using a content of the communication data and historical data from one or more external sources; generate, based on an assessment of the contextual input, a sensitivity index score for a plurality of elements of the communication data; and encode an element of the communication data having a sensitivity index score above a predefined threshold value, wherein at least one other element of the communication data having a sensitivity index score below the predefined threshold value remains unencoded.

A third aspect of the present invention provides a computer program product for securing sensitive information in communication data, the computer program product comprising a computer readable storage media, and program instructions stored on the computer readable storage media, that cause at least one computer device to: receive as input a communication data; derive a contextual input using a content of the communication data and historical data from one or more external sources; generate, based on an assessment of the contextual input, a sensitivity index score for a plurality of elements of the communication data; and encode an element of the communication data having a sensitivity index score above a predefined threshold value, wherein at least one other element of the communication data having a sensitivity index score below the predefined threshold value remains unencoded.

Still yet, any of the components of the present invention could be deployed, managed, serviced, etc., by a service provider who offers to implement the teachings of this invention in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
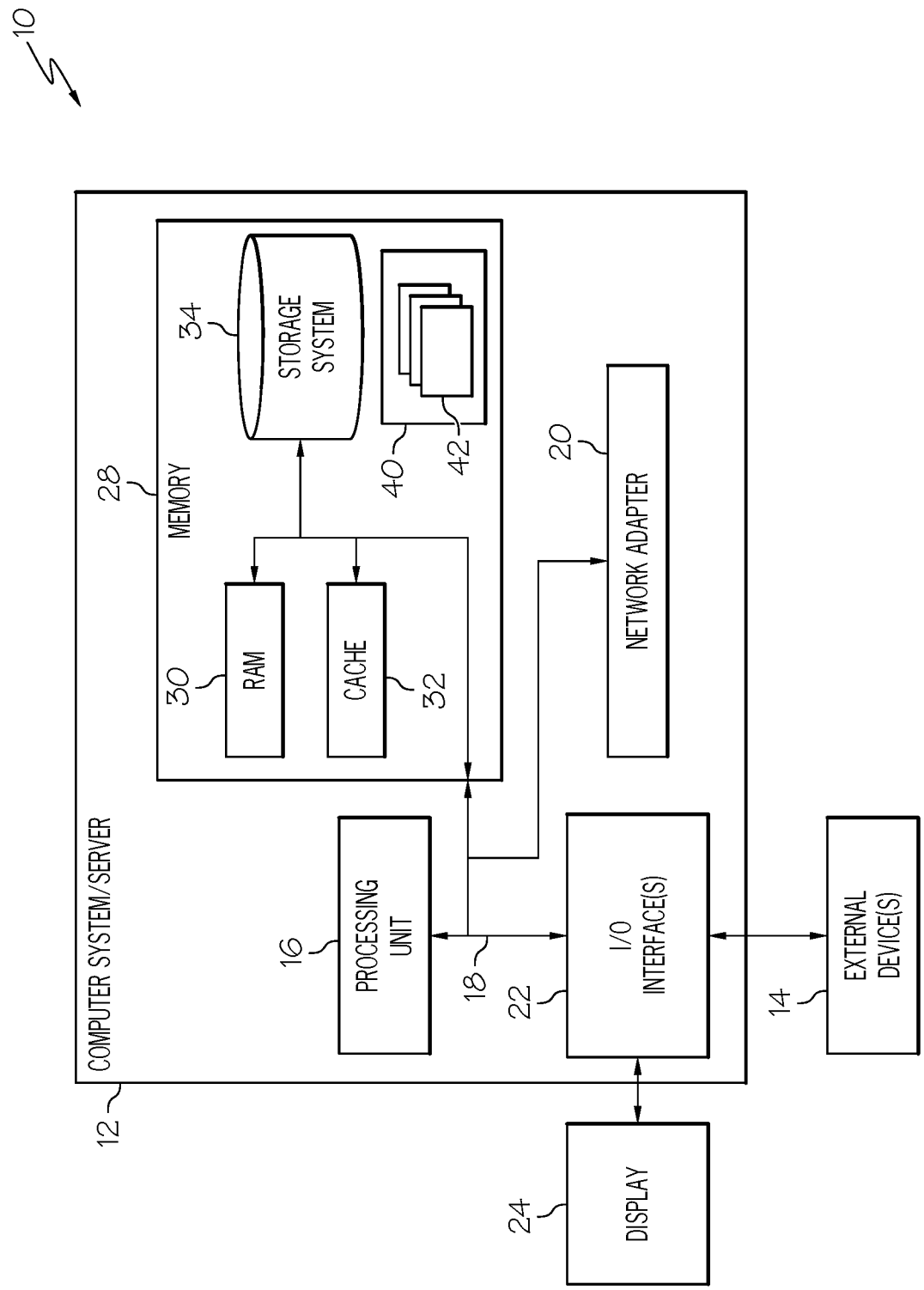
FIG. 1 depicts a computing environment according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for securing sensitive information in communication data. In an embodiment, communication data is received from an ongoing communication (e.g., phone conversation, exchange of text messages, etc.) between a user and at least one other person. Contextual input is derived based on the content of the communication data and historical data from one or more external sources. A sensitivity index score for each element (e.g., portion) of the communication data is derived based on an assessment of the contextual input. The elements of the communication data having a sensitivity index score greater than a predefined threshold value are deemed to be security sensitive and, therefore, are encoded prior to transmission to its intended recipient.

Referring now to FIG. 1, a schematic of an example of a computing environment is shown. Computing environment 10 is only one example of a suitable computing environment and is not intended to suggest any limitation as to the scope of use or functionality of embodiments of the invention described herein. Regardless, computing environment 10 is capable of being implemented and/or performing any of the functionality set forth hereinabove.

In computing environment 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and/or the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing environment 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM, and/or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
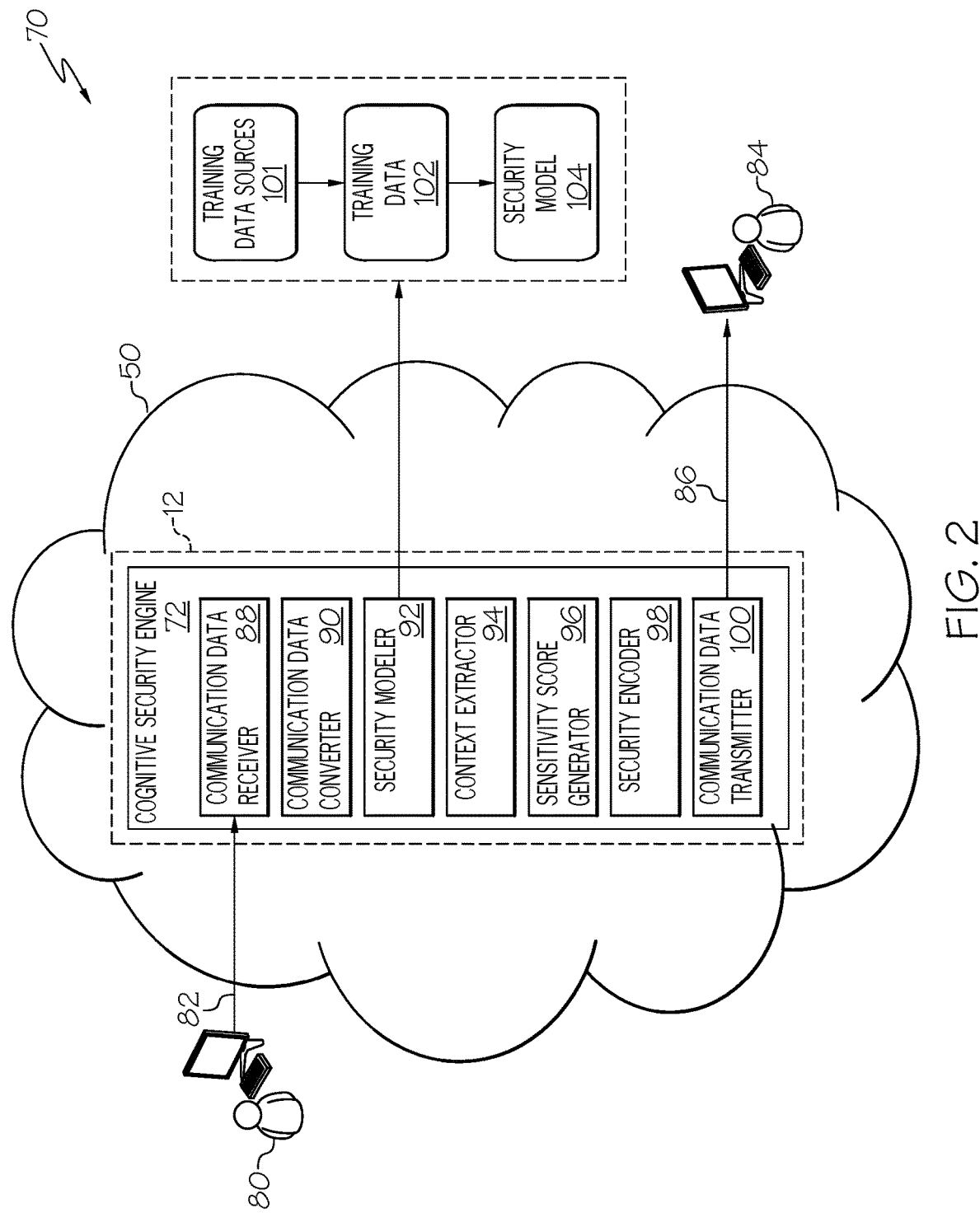
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each client need not have a cognitive security engine (hereinafter "system 72"). Rather, system 72 could be loaded on a server or server-capable device that communicates (e.g., wirelessly) with the clients to determine a veracity of a reported event therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

Along these lines, system 72 may perform multiple functions similar to a general-purpose computer. Specifically, among other functions, system 72 can selectively apply a security protocol to security sensitive information in communication data. To accomplish this, system 72 can include: a communication data receiver 88, a communication data converter 90, a security modeler 92, context extractor 94, sensitivity score generator 96, security encoder 98, and a communication data transmitter 100. As shown, in an embodiment, security modeler 92 selects training data 102 from training data sources 101 to be used to generate a runtime security model 104 (discussed in greater detail below).

The inventors of the invention described herein have discovered certain deficiencies in the current solutions for encoding communication data 82. For example, some current solutions call for securing communication data using security techniques such as encryption. Encryption can provide a communication with confidentiality, the assurance that transmitted information is only read by the recipient and not by an eavesdropper. However, current measures are often indiscriminate and general, without regard to the type or nature of information and data involved in a particular transmission.

The present invention applies differential security to communication data elements within a content message by using supervised learning classification techniques to dynamically generate sensitivity index scores based on an assessment of contextual parameters (e.g., data source, content category, entity type, etc.) and historical content elements to determine which elements in the content should be treated as sensitive/confidential. This approach allows selective masking/obfuscation of structured/unstructured content elements within a content message by deriving a contextual data sensitivity rating for individual/composite elements in order to keep sensitive information secure from potential eavesdroppers and/or competitors. Further, this approach allows for dynamic identification and creation of data security protocols, as compared to traditional ways of authoring data security protocols and then deploying them at enforcement points. This approach identifies data security policies on the fly based on data security principles and context-based data classification and can adapt over time to changing security contexts and/or needs.

Referring again to FIG. 2, communication data receiver 88 of system 72, as executed by computer system/server 12, is configured to receive communication data 82 via a communication data channel from user 80. Communication data 82 received over a communication channel can include written text (e.g., text messages, instant messages), video including spoken words (e.g., video conference call), audio data (e.g., phone call), and/or any data related to an exchange of information that can be transmitted from one person to another. For example, communication data 82 can include a series of text messages from user 80 to user 84. All or portions of the text messages may be encoded as communication data 86 when delivered to user 84 to provide enhanced security.

Communication data converter 90 of system 72, as executed by computer system/server 12, is configured to dynamically convert communication data to a different format, when necessary, for analysis to determine whether any security sensitive information is included in communication data. For example, during a video conference call involving user 80, the user's voice communication (i.e., spoken words) during the video conference call can be converted to written text for easier analysis. A speech-to-text conversion process can be done in three steps. Audio segments containing speech are first identified. Then, the process recognizes the language being spoken. Finally, the process converts the speech segments to text and time codes. In an embodiment, the result can include a fully annotated XML document including speech and non-speech segments, speaker labels, words with time codes, high quality sensitivity index scores related to conversion accuracy, and punctuations. This XML file can be converted into plain text for analysis. Any conversion and analysis must take place in real time (or near real time) so that any security sensitive information in communication data 82 from user 80 can be encoded prior to transmission to user 84.

Security modeler 92 of system 72, as executed by computer system/server 12, is configured to generate, using one or more machine learning techniques, a runtime security model to assess security sensitivity of real-time communication data. Machine learning is a subset of artificial intelligence in the field of computer science that often uses statistical techniques to give computers the ability to "learn" (i.e., progressively improve performance on a specific task) with data, without being explicitly programmed. The runtime security model can be built and applied to distinguish between two types of elements (e.g., those requiring encoding and those not requiring encoding) of communication data based on the features/characteristics of the elements. As used herein, an "element" of communication data refers to any portion of a communication either real time or historical, such as one or more lines of written text, one or more spoken sentences or phrases, and/or the like. Elements can be defined/identified based on their respective security sensitivity. For example, user 80 may type two sentences to be transmitted. The first sentence may require encoding, while the second does not. In this example, each sentence can be described as separate elements.

Three aspects can generally describe the process of generating a runtime security model which can be used to calculate sensitivity index scores for the different elements of communication data. First, sample data is collected that describes the issue at hand (i.e., when to encode elements of communication data) with known relationships between inputs and outputs. Second, an algorithm is defined based on the historical data to create a runtime security model that can be used over and over again. Third, the learned runtime security model is used on new communication data for which we don't know the output to generate sensitivity index scores for elements of the communication data. Each aspect is discussed in greater detail below.

A scoring model is made up of a number of contextual parameters, which are features or variables that are likely to influence a calculated sensitivity index score. The contextual parameters define the relationships between the inputs and outputs of the security model. The calculated sensitivity scores are used to determine whether to encode one or more elements of received communication data. By assessing the sample data, the contextual parameters can be defined, either manually or automatically, based on how each influences an outcome. The sample data may include historical communication data, such as previous phone conversations, email messages, text messages, etc. between persons having different roles/responsibilities. As stated, a contextual parameter is a feature or variable related to at least one element of a historical communication that influences whether the element requires encoding based on its security sensitivity.

Examples of contextual parameters can include, but are not limited to, a role or responsibility of a sender/receiver, a location (e.g., public place, local cultural considerations, etc.) of the sender/receiver, a content category (e.g., discussion related to a person's professional position or salary, etc.), relationship of communication parties (e.g., current or potential business competitors, etc.), organization or domain input (e.g., trade secrets, business conduct guidelines, trade regulations, etc.) and/or the like. The examples are illustrative only and not intended to be limiting. Any feature or variable related to communication data that is likely to influence an encoding decision may be defined as a contextual parameter.

Once historical data has been collected for relevant contextual parameters, a scoring model can be formulated. In an embodiment, once formulated, the scoring model can be "trained" using the historical communication data as training data 102. Referring back to FIG. 2, training data 102 can be selected from training data sources 101 to create and tune the scoring model. As stated, training data 102 includes a set of examples used for learning in order to fit the parameters (e.g., weights) of, for example, a classifier. Generally, the training data 102 for training a scoring model is selected from training data sources 101. Training data 102 can include a wide range of inputs. For example, to create and tune a scoring model, training data sources 101 can include historical communication data, as described above.

Model development is generally a two-stage process. The first stage is training and validation, during which algorithms are applied to historical data (e.g., previous communications between multiple roles covering a multitude of topics) for which the outcomes are known to uncover patterns between its features and the target variable. The second stage is scoring, in which the trained scoring model is applied to a new test dataset. When the scoring model is providing accurate sensitivity index scores for elements within the test dataset, a runtime security model 104 can be created from the trained scoring model to assess real-time data communications. In an embodiment, runtime security model 104 is in place prior to assessing real-time data communications for the purpose of encoding security sensitive information being conveyed.

Context extractor 94 of system 72, as executed by computer system/server 12, is configured to determine contextual input from communication data 82. Contextual input acts as input which can be fed to runtime security model 104 to generate a data sensitivity score for each element contained in communication data 82. The contextual input directly relates to one or more defined contextual parameters (previously described). The contextual parameters describe the relationships between the input (i.e., each element of communication data 82) and its derived output score. Contextual input can include content of communication data 82, as well as contextual information related to the content garnered from external sources such as social media sites, corporate sites, research papers, news feeds, and/or the like.

For example, machine learning algorithms can be applied to recognize and match patterns in a conversation (e.g., using voice intonation/modulation, historical feedback, etc.) to derive contextual input for each element/portion (e.g., phrase) of communication data 82. In an embodiment, context extractor 94 can use natural language classification from existing sources (e.g., organizational data, such as business processes, case information, etc.) and machine learning algorithms to recognize and match patterns in a conversation (e.g., using voice intonation/modulation, historical feedback, etc.) to derive contextual input for each element/portion (e.g., phrase) of communication data 82. Human language is complex and diverse. Not only are there hundreds of languages and dialects, but within each language is a unique set of grammar and syntax rules, terms, and slang. Misspellings, abbreviated words, omitted punctuation, and the like, may occur in text. Likewise, regional accents, mumbles, stutters, terms borrowed from other languages, and the like, may occur in speech. Applying natural language processing (NLP) techniques to communication data 82 helps resolve ambiguity in language and adds useful numeric structure to the communication data 82 for deriving contextual input needed for assessing the sensitivity of the data.

Data sensitivity score generator 96 of system 72, as executed by computer system/server 12, is configured to generate a security sensitivity score for each element (i.e., portion) of communication data 82. As stated, an element may include all or any number of portions (e.g., one or more lines of written text, one or more spoken sentences or phrases, etc.) of communication data 82 being transmitted from user 80 to one or more other persons (e.g., user 84). As described, context extractor 94 can dynamically adjust and adapt to understand a context and intent behind an ongoing communication. As such, data sensitivity score generator 96 provides the ability to interactively and iteratively assess sensitive verbiage/words based on dynamically varying the sensitivity index score based on a change in sensitivity scores as a communication progresses.

For example, assume a caller says to user 80, "Jill has been struggling to secure key stakeholder buy-in in her role as a technical writer. In my view, we need to review whether to relieve her from her position." User 80 responds, "In my view, she should be put on a performance improvement plan. She has a very high billing rate of $200 per hour, which is a cost we can continue to bear until we find a suitable alternative." In this example, context extractor 94 can leverage prior conversational context in determining that subsequent content should be treated as sensitive. In this example, information related to Jill's billing rate and potentially replacing her may be deemed sensitive and require more stringent security measures be taken on that information.

Security encoder 98 of system 72, as executed by computer system/server 12, is configured to encode security sensitive information of communication data 82 prior to transmission to its intended recipient(s) via a communication channel. Encoding is the process of converting the data or a given sequence of characters, symbols, alphabets, etc., into a specified format, for the secured transmission of data. Decoding is the reverse process of encoding which is to extract the information from the converted format. For example, security sensitive information of communication data 82 may be selectively and dynamically encrypted, while portions of communication data 82 deemed not to be sensitive will not be encrypted. Encryption is the method by which plain text or any other type of data is converted from a readable form to an encoded version that can only be decoded by another entity if they have access to a decryption key. Encryption is an important method for providing data security, especially for end-to-end protection of data transmitted across networks.

In another example, data masking or data obfuscation of security sensitive information of communication data 82 may be enabled. This method involves hiding original data with random characters or data. In any case, security sensitive information is encoded using any technique, now known or later developed, which can provide adequate protection of sensitive information being transmitted.

Figure 3:
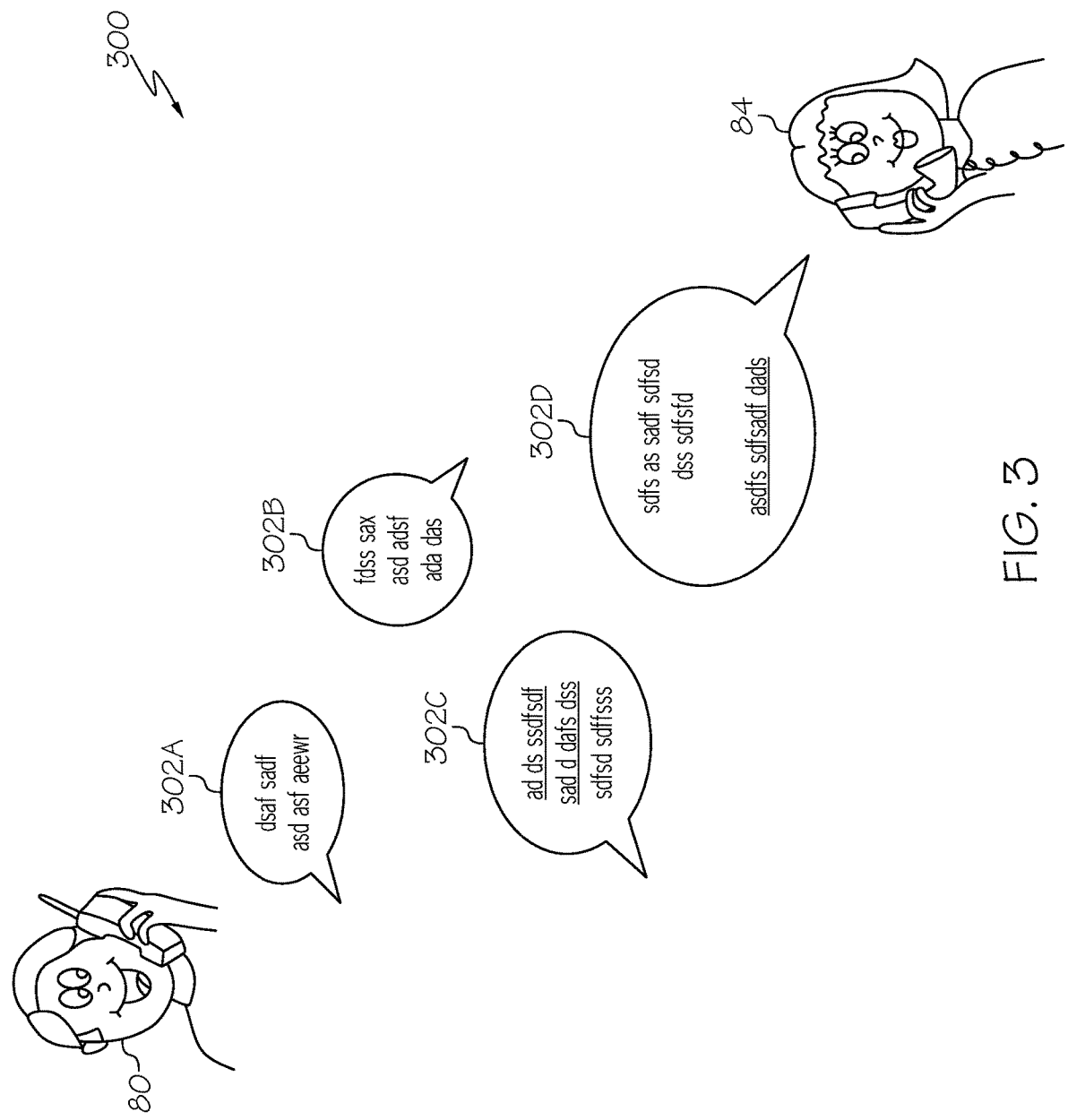
FIG. 3 depicts an example conversation according to an embodiment of the present invention.

FIG. 3 depicts an example of communication data 82 according to an embodiment of the present invention. As shown, user 80 is having a phone conversation with user 84. A calculated sensitivity index score on an element of communication data 82 that is greater than a predefined threshold may indicate that a portion of the communication is security sensitive and a security protocol should be applied. The speaking parts 302A, 302C are shown for user 80, while speaking parts 302B, 302D are shown for user 84. Not all portions of communication data 82 (which include 302A-D) are encoded. Only portions of the conversation having a sensitivity index score greater than a predefined threshold are encoded. Encoded portions of communication data 82 are shown as underlined in each text bubble. In other words, a portion of 302C and a portion of 302D are encoded, while the other portions of the conversation are not encoded. Speaking portions that have been encoded must be decoded before being relayed to the respective listener.

Communication data transmitter 100 of system 72, as executed by computer system/server 12, is configured to transmit communication data via a communication channel from sender to one or more receivers/recipients. One or more portions of communication data may include security sensitive information which has been encoded, as discussed above. At a receiver end, a receiver may or may not be authorized to decode the information. If authorized, a decoder (not shown) can decode any encoded security sensitive information of communication data 82. If not authorized, the encoded (e.g., masked) information is not decoded and will be relayed to the receiver still encoded or otherwise hidden from the receiver (e.g., redacted text). The complete communication 86 (e.g., all non-security sensitive information and any decoded information) is then relayed to the receiver (e.g., user 84) via the communication channel.

Figure 4:
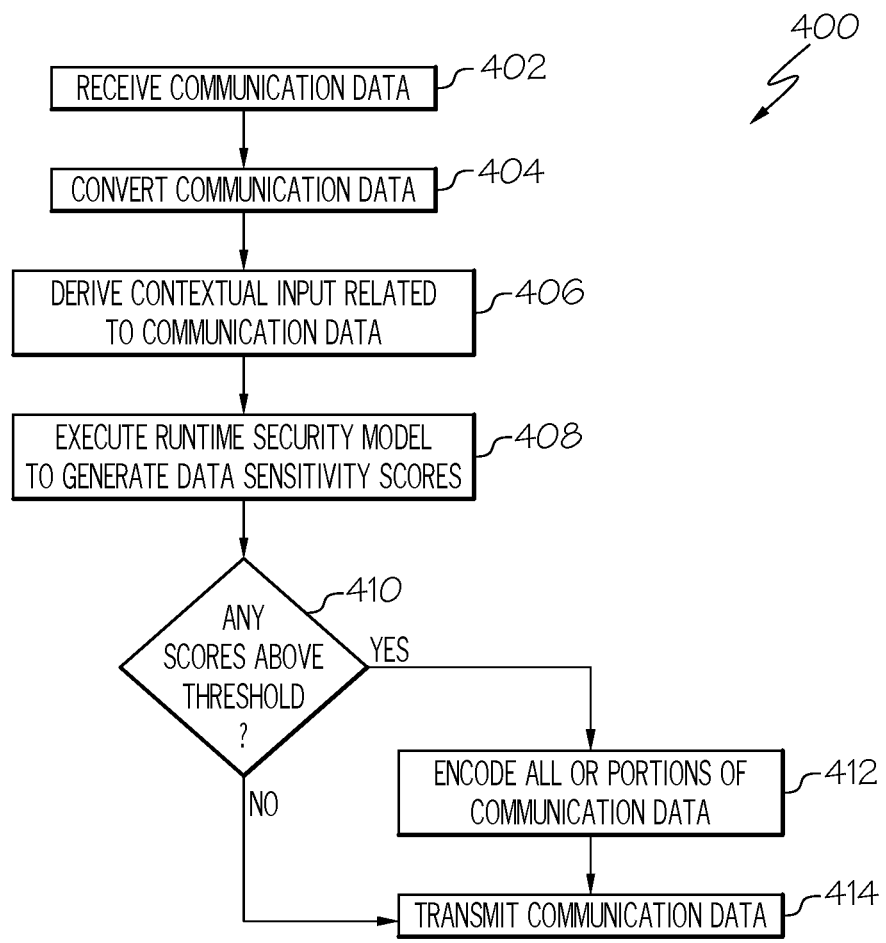
FIG. 4 depicts an example process flowchart according to an embodiment of the present invention.

Referring now to FIG. 4 in conjunction with FIG. 2, a method flow diagram 400 according to an embodiment of the present invention is shown. At 402, communication data receiver 88 of system 72, as executed by computer system/server 12, retrieves communication data 82. At 404, communication data converter 90 of system 72, as executed by computer system/server 12, converts communication data 82 to a different form for analysis, if necessary. At 406, context extractor 94 of system 72, as executed by computer system/server 12, derives, using the content of communication data 82 and data from external sources, contextual input related to communication data 82. At 408, a runtime security model is executing, using contextual data as input, to calculate one or more sensitivity index scores related to elements of communication data 82.

At 410, security encoder 98 of system 72, as executed by computer system/server 12, determines the elements/portions of communication data 82 which have a sensitivity index score above a predefined threshold and, at 412, encodes those portions (e.g., via encryption). At 414, communication data transmitter 98 of system 72, as executed by computer system/server 12, transmits the payload (i.e., encoded and non-encoded portions of communication data 82) to one or more intended receivers.

Consider two separate scenarios in which an executive from Company A is having a phone conversation with an executive from Company B about a new offering from Vendor A. In scenario 1, the context of the conversation is identified as relating to the new offering. The content and data from external sources used to establish contextual input does not indicate any reasons to mask any portions of the conversation, so no encoding is performed. However, assume contextual input related to scenario 2 indicates that the two companies have been involved in a prior bidding war related to a previous offering from the same vendor. In this example, further assume Company B has invoked the mechanism described herein, so that some elements of the conversation (e.g., pricing information related to the offering from Vendor A) spoken by the executive from Company B have been assigned a sensitivity index score above a predefined threshold. Therefore, this information is masked prior to being relayed from to the executive from Company A.

The flowchart of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for selectively applying a security protocol to security sensitive information in communication data, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for responding to a threat. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for selectively applying a security protocol to security sensitive information in communication data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for selectively applying a security protocol to security sensitive information in communication data. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for securing sensitive information in a communication, comprising:
    receiving as input a communication data, the communication data including real time voice conversation data;
    deriving a contextual input using a content of the communication data and historical data from one or more external sources;
    generating, based on an assessment of the contextual input, a sensitivity index score for a plurality of elements of the communication data in real time as the real time voice conversation data is being communicated by interactively and iteratively assessing sensitive verbiage/words based on dynamically varying the sensitivity index score based on a change in sensitivity scores as a real time voice conversation progresses;
    encoding an element of the communication data having a sensitivity index score above a predefined threshold value, wherein at least one other element of the communication data having a sensitivity index score below the predefined threshold value remains unencoded;
    transmitting the communication data including the one or more encoded elements to a recipient; and
    decoding, prior to receiving the communication data by the recipient, the one or more encoded elements in real time as the real time voice conversation data is being received.

2. The computer-implemented method of claim 1, wherein the assessment of contextual input includes executing, using the contextual input as input, a runtime security model to generate the sensitivity index score for each element of the communication data.

3. The computer-implemented method of claim 1, wherein the encoding is selected from a group consisting of: encrypting, masking, and obfuscating the one or more elements.

4. The computer-implemented method of claim 1, further comprising converting, when the communication data includes a voice communication, the voice communication to text.

5. The computer-implemented method of claim 1, wherein deriving the contextual input includes defining a relationship between a sender and a recipient of the communication data, and wherein the contextual parameters include roles of the sender and receiver, an overall content category of the communication data, a relationship of communication parties, and an organization input.

6. The computer-implemented method of claim 1, further comprising:
   collecting historical communication data to define a set of contextual parameters;
   formulating, from the set of contextual parameters, a scoring model;
   training, using training data, the scoring model to generate a trained model; and
   generating, from the trained model, the runtime security model.

7. A system for securing sensitive information in communication data, comprising:
   a memory medium comprising instructions;
   a bus coupled to the memory medium; and
   a processor coupled to the bus that when executing the instructions causes the system to:
      receive as input a communication data, the communication data including real time voice conversation data;
      derive a contextual input using a content of the communication data and historical data from one or more external sources;
      generate, based on an assessment of the contextual input, a sensitivity index score for a plurality of elements of the communication data in real time as the real time voice conversation data is being communicated by interactively and iteratively assessing sensitive verbiage/words based on dynamically varying the sensitivity index score based on a change in sensitivity scores as a real time voice conversation progresses;
      encode one or more elements of the communication data having a sensitivity index score above a predefined threshold value;
      transmit the communication data including the one or more encoded elements to a recipient; and
      decode, prior to receiving the communication data by the recipient, the one or more encoded elements in real time as the real time voice conversation data is being received.

8. The system of claim 7, wherein the assessment of contextual input includes executing, using the contextual input as input, a runtime security model to generate the sensitivity index score for each element of the communication data.

9. The system of claim 7, wherein the encoding is selected from a group consisting of: encrypting, masking, and obfuscating the one or more elements.

10. The system of claim 7, the instructions further causing the system to convert, when the communication data includes a voice communication, the voice communication to text.

11. The system of claim 7, wherein deriving the contextual input includes defining a relationship between a sender and a recipient of the communication data, and wherein the contextual parameters include roles of the sender and receiver, an overall content category of the communication data, a relationship of communication parties, and an organization input.

12. The system of claim 7, the instructions further causing the system to:
   collect historical communication data to define a set of contextual parameters;
   formulate, from the set of contextual parameters, a scoring model;
   train, using training data, the scoring model to generate a trained model; and
   generate, from the trained model, the runtime security model.

13. A computer program product for securing sensitive information in communication data, the computer program product comprising a computer readable storage media, and program instructions stored on the computer readable storage media, that cause at least one computer device to:
   receive as input a communication data, the communication data including real time voice conversation data;
   derive a contextual input using a content of the communication data and historical data from one or more external sources;
   generate, based on an assessment of the contextual input, a sensitivity index score for a plurality of elements of the communication data in real time as the real time voice conversation data is being communicated by interactively and iteratively assessing sensitive verbiage/words based on dynamically varying the sensitivity index score based on a change in sensitivity scores as a real time voice conversation progresses;
   encode one or more elements of the communication data having a sensitivity index score above a predefined threshold value;
   transmit the communication data including the one or more encoded elements to a recipient; and
   decode, prior to receiving the communication data by the recipient, the one or more encoded elements in real time as the real time voice conversation data is being received.

14. The computer program product of claim 13, wherein the assessment of contextual input includes executing, using the contextual input as input, a runtime security model to generate the sensitivity index score for each element of the communication data.

15. The computer program product of claim 13, wherein the encoding is selected from a group consisting of: encrypting, masking, and obfuscating the one or more elements.

16. The computer program product of claim 13, the instructions further causing the at least one computer device to convert, when the communication data includes a voice communication, the voice communication to text.

17. The computer program product of claim 13, wherein deriving the contextual input includes defining a relationship between a sender and a recipient of the communication data, and wherein the contextual parameters include roles of the sender and receiver, an overall content category of the communication data, a relationship of communication parties, and an organization input.

* * * * *